United States Patent
Reinbold et al.

[11] 3,771,775
[45] Nov. 13, 1973

[54] REFRACTORY-LINED CONTAINER FOR SCRAP

[75] Inventors: Richard J. Reinbold, Allentown; Melvin J. Mateer, Middletown; John F. Muhlhauser, Lemoyne, all of Pa.

[73] Assignee: Bethlehem Steel Corp., Bethlehem, Pa.

[22] Filed: July 3, 1972

[21] Appl. No.: 268,414

[52] U.S. Cl. .................................. 266/5 R, 266/24
[51] Int. Cl. ............................................ F27b 17/00
[58] Field of Search ...................... 266/5 R, 5 F, 24, 266/43; 214/18 SC

[56] References Cited
UNITED STATES PATENTS
2,804,295  8/1957  Brooke ........................... 266/5 R Primary Examiner—Gerald A. Dost
Attorney—Joseph J. O'Keefe

[57] ABSTRACT

A scrap container wherein scrap is preheated, having the inner surface of the shell lined with refractory material, including a first expansion means atop the refractory lining and a second expansion means below the refractory lining.

12 Claims, 2 Drawing Figures

REFRACTORY-LINED CONTAINER FOR SCRAP

BACKGROUND OF THE INVENTION

This invention is directed to an improved container in which scrap is preheated prior to charging into an electric arc furnace. The container is lined with refractory shapes. Steelmaking processes, for example, open-hearth, basic oxygen, electric-arc and the like, use cold steel and/or iron scrap as at least a portion of the raw material charge placed in the steelmaking furnaces. About 35 percent to about 60 percent of the raw material charge in the open-hearth process is scrap. The basic oxygen process uses about 25 percent to 30 percent scrap in the raw material charge. The electric-arc process uses substantially 100 percent scrap. Scrap is included in the raw material charge because it is readily available and is generally cheaper than hot metal. Then, too, some plants may not have a sufficient source of hot metal to make up the required raw material charge. The use of scrap also conserves the available iron ores and concentrates for future use.

Prior practices have been to charge cold scrap into the furnace used to produce steel. As a result, heating time was increased because the scrap had to be heated to melting temperature before refining took place in the steelmaking process. Previous attempts to preheat the scrap prior to charging into a steelmaking furnace have been made. The scrap has in such cases been charged into a refractory-lined container wherein hot combustion gases are passed toward or downwardly through the scrap.

One such container and attendant apparatus used to preheat scrap is shown in application Ser. No. 238,870, filed Mar. 28, 1972, in the name of R. J. Reinbold et al. and titled "Apparatus and Method for Preheating Scrap".

The refractory lining in the described container is supported by a steel refractory support ring welded to the inside surface of the cylindrical shell of the container at or near the bottom thereof. The refractory lining extends upwardly to the top of the container. When hot combustion gases, such as are formed by burning natural gas in a refractory-lined burner hood resting atop the container, are passed through the scrap charge to heat the scrap, the refractory lining is heated and expands. The refractory lining cannot expand downwardly because of the refractory support ring welded to the shell of the furnace. Therefore, the refractory lining will expand upwardly. However, because of the weight of the hood atop the container, the expansion of the refractory lining in an upwardly direction is retarded. The refractory lining, however, must expand in some direction as it is heated and thus expands upwardly as much as it can, and then buckles inwardly into the container, forming bulges in the refractory lining of the container.

When a load of scrap is charged into the container, the scrap bumps the topmost refractory causing it to break and fall out of the lining into the container. The impact of the scrap on the refractory lining can also break the refractory lining at the bulges in the lining. Furthermore, when the burner hood is removed from atop the container, the refractory lining being hot, expands upwardly beyond the top of the container. When the burner hood is then lowered atop the container to preheat the next scrap charge, the refractory lining which extends above the container is broken. In addition, when the refractory lining contracts during cooling, the lining tends to pull away from the shell. In any of these cases, frequent repair of the refractory lining is usually necessary, thereby increasing the cost of operation and causing delay in melting and refining steel because of reduced availability of the containers.

Another problem arises because scrap charged into the container can contain elongated pieces, for example, rails, structural shapes and the like. Elongated pieces of scrap charged into the bottom of the container can frequently extend all the way from the base of the clam to the wall of the container beneath the refractory support ring. The elongated pieces of scrap become wedged between the underside of the refractory support ring and the clam. The wedged pieces of scrap make it extremely difficult, if not impossible, to open the clam when it is desired to charge the scrap into an electric furnace. If the clam opening apparatus is forced, the cables by which the clam is opened can fail making it impossible to open the clam. The container must then be placed on the floor of the shop and the scrap charge cooled to temperature sufficiently low so that the scrap charge can be removed by the use of electromagnets.

Forcibly opening the clam will sometimes dislodge the wedged pieces of scrap; however, in this event the refractory lining in the adjacent areas can be damaged or the clam itself can be damaged. In any event, the additional steps involved in getting wedged scrap out of the container, for example, time consumed in cooling the scrap charge, removing the scrap charge from the container by the use of electromagnets, and removing the container from service for repair, are additional costs which must then be added to production costs. In addition, production lags because of the time element involved in repair of the container and because of the reduced availability of the container during the time required for cable replacement and the like.

It is therefore an object of this invention to provide an improved refractory-lined container for scrap which will alleviate the foregoing problems.

It is another object of this invention to provide an improved refractory-lined container having thermal expansion means associated with the top and bottom of the refractory lining in the container whereby damage to the refractory lining is minimized and container availability optimized.

SUMMARY OF THE INVENTION

Broadly, the apparatus of the invention is a container having the interior lined with refractory materials, a first expansion means associated with the top of the refractory lining and a second expansion means associated with the bottom of the refractory lining.

DESCRIPTION OF THE PREFERRED EMBODIMENT

Figures 1, 2:
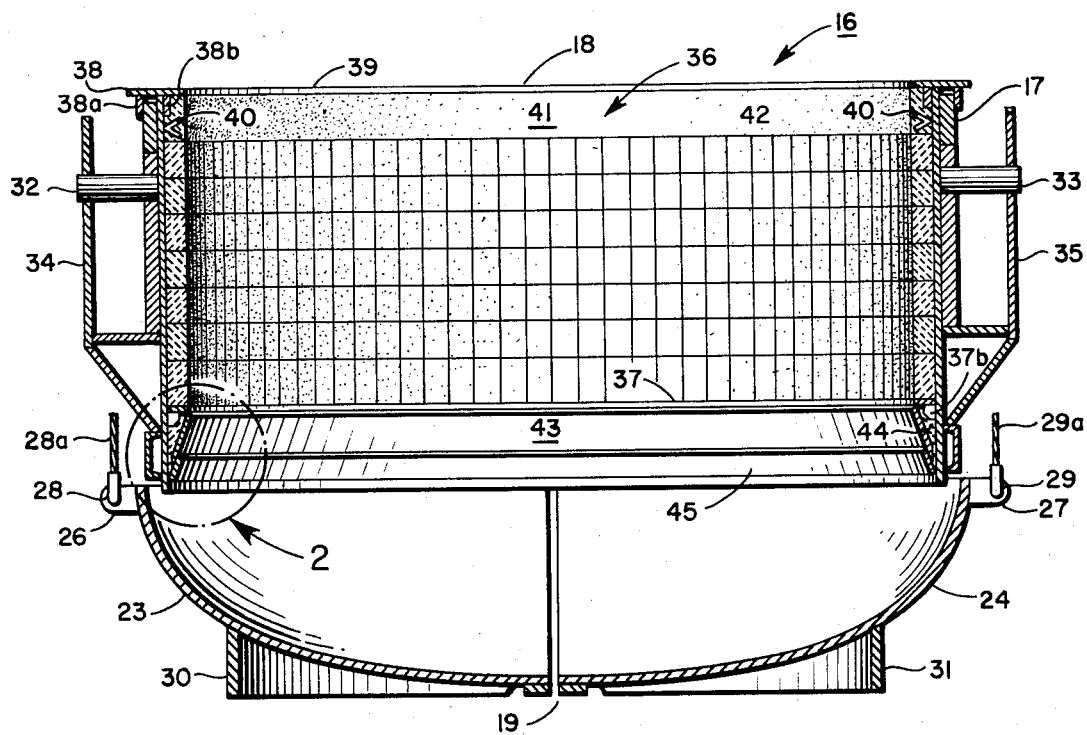
FIG. 1 is a view in cross-section of the improved container of the invention.
FIG. 2 is an enlarged view of the circled area 2 of FIG. 1.

Referring to the drawings of the invention, FIG. 1 is a cross-sectional view of a portable container 16 for use in preheating scrap. The portable container 16 is a vertical, generally cylindrical steel shell 17 having a normally open upper end 18 through which scrap can be charged therein, and a normally closed lower end 19. The closure on the lower end comprises a clam which has two identical partible swinging jaws 23 and 24. Each of the partible jaws 23 and 24 has a bracket 26 and 27 respectively at the periphery of the jaw; each of which brackets is provided with an opening 28 and 29 respectively. One end of cables 28a and 29a is respectively fixedly attached to the partible jaws 23 and 24 through the openings 28 and 29. The other end of each of the cables 28a and 29a is fastened to appropriate equipment (not shown) which when supported by an overhead crane and attendant crane hooks (also not shown) is used to open the partible jaws 23 and 24 by pulling the cables 28a and 29a. Each of the partible jaws 23 and 24 is provided with a semi-cylindrical steel support member 30 and 31 fastened, for example, by welding, to the bottom thereof.

Container 16 is provided with lifting means comprising a pair of opposed trunnions 32 and 33 and attendant structural steel supports 34 and 35 whereby the container 16 can be lifted, for example, by a crane, and carried to a steel-making furnace for discharge of preheated scrap into the furnace.

A refractory lining shown generally at 36 is laid-up against the inside surface of the shell 17 of the container 16. The refractory lining 36, which is made up of refractory shapes laid-up in parallel horizontal rows 42, is supported by a refractory support steel ring 37 welded to the inside surface of shell 17 in the lower portion thereof. Steel brackets or gussets 37b are welded to the inside of the shell 17 beneath the refractory support ring 37 to help in the support thereof. The brackets 37b are spaced around the periphery of the inside of the shell 17. The refractory lining 36 extends upwardly from the refractory support ring 37 toward the top of the container but terminates a distance therefrom. The distance from the top of the refractory lining 36 in the shell 17 to the top of the shell of the container is equal to about the length of one of the refractory shapes used to line the shell 17 of the container 16. A burner hood support steel ring 38 having a generally inverted U-shape is attached to the top of the shell 17 to provide a substantially flat surface 39 whereon a burner hood (not shown) can be supported. The legs 38a and 38b extend downwardly over the shell 17 to aid in positioning the ring 38.

A plurality of steel anchor members 40 equally spaced from each other and extending 360° around the inside periphery of the steel shell 17 are fixedly attached to the shell in the top portion thereof between the top of the refractory lining 36 and the top of the container 16. A refractory material 41 capable of withstanding elevated temperatures is rammed into place between the top row 42 of the refractory lining 36 and the steel ring 38 attached to the top of the container 16. The rammed refractory material is supported in place by the anchor members 40. When hot combustion gases pass downwardly through the scrap in the container 16, the rammed refractory 41 has enough elasticity at elevated temperatures to allow the upward expansion of the refractory lining 36. As a result, the refractory lining does not bulge or buckle but remains against the shell of the container.

When the scrap is charged into the furnace and the refractory lining contracts due to cooling, the rammed refractory remains keyed in place by the anchor members 40. A void is then created between the top course of the refractory lining and the rammed refractory. When the refractory lining is again heated by hot combustion gases passing downwardly through the scrap during the next preheating operation, the expansion of the refractory lining fills the void and also remains in place along the shell of the container. Since the refractory lining does not bulge into the container, the refractory lining is not susceptible to fracture by impact of scrap thereon.

A baffle plate, which can be a steel ring, 43 is attached, for example, by welding, to the bottom of the refractory support steel ring 37 in inclined relationship thereto. The baffle plate 43 extends divergently downwardly from the inside portion 37a of the refractory support steel ring 37 toward the bottom of the container 16 and terminates a distance from the inside surface of the steel shell 17 leaving a gap 44 therebetween and forming an enclosure 46 between the shell 17 and ring 43. A second baffle plate or baffle 45, which can also be a steel ring, is attached, for example, by welding, to the inside surface of the steel shell 17 and extends convergently upwardly therefrom. The baffle plate 43 and the baffle plate 45 overlap and are positioned in close proximity to each other. The two plates are preferably in slidable contact with each other. In order to protect the shell of the container during the passage of hot combustion gases downwardly through the scrap, a refractory is rammed into the enclosure 46 between steel rings 43 and 45, the shell 17 and the bottom of the support ring 37.

As shown in FIG. 2, which is an enlarged section 2 of FIG. 1, a right triangularly shaped space or enclosure 46 extending around the periphery of the container 16 is formed beneath the refractory support steel ring 37. A boundary 47 of the space 46 is formed by a portion of the shell 17. A second boundary 48 is formed by the refractory support steel ring 37. The hypotenuse 50 of the right triangle is formed by the first steel ring or baffle 43 and the second steel ring or baffle 45 shown overlapped and in slidable contact with each other. The space 46 is filled with a castable refractory 55. When the scrap charge in the container 16 is heated the steel rings 37, 43 and 45 will expand. Because the baffles 43 and 45 are free to expand when heated to elevated temperatures, the danger of weld failure due to expansion is reduced to a minimum. The presence of the baffles 43 and 45 prevents long pieces of scrap from becoming wedged between the clam and the underside of refractory support ring 37 and allows the partible jaws 23 and 24 of the clam to be opened without danger of sticking or binding. Failure of cables 28a and 29a (FIG. 1) is thus minimized. Since there is no undue disturbance of the refractory lining 36, because of jammed clam jaws, repairs and relining of the refractory are decreased to a minimum. It is possible to provide only one of the baffle plates 43 and 45 in inclined relationship to the refractory support ring 37 and the shell 17 of the container 16 to prevent elongated pieces of scrap from becoming wedged beneath the refractory support ring 37. If only one of either baffle plate 43 or 45 is used, it must be understood that the single baffle plate will not extend the entire distance between the refractory support ring 37 and the shell 17 of the container 16 but will terminate a short distance therefrom leaving a gap such as is shown at 44 between baffle plate 43 and the shell 17. The opening or gap between the single baffle plate and the adjacent portions of the container will allow for expansion and contraction of the baffle plate without causing damage to the refractory of the container. While a single baffle plate can be used, it is much preferred to use the overlapping baffle plate arrangement illustrated in FIGS. 1 and 2.

We claim:

1. A container for preheating scrap in a preheater station, which container comprises in combination a metallic shell, a refractory support ring fixedly attached to and extending around the periphery of the inside of the shell in the lower portion thereof, a refractory lining comprised of abutting refractory shapes laid-up against the inside of the shell and extending upwardly therein from the refractory support ring toward the top of the shell but in spaced relationship therefrom, said space between the refractory shapes and the top of the shell being equal to about one refractory shape length, a pair of partible jaws attached to a bracket on the outside of the shell and forming a closure on the bottom of the container, a plurality of anchor members securely fastened to and spaced 360° around the inside of the top of the container in the space between the top row of the refractory lining and the top of the shell and a compressible rammed refractory laid-up against the shell of the container in said space between the top layer of the refractory lining and the top of the shell of the container in alignment with the refractory lining and encasing said anchor members whereby said rammed refractory is anchored in place.

2. A container for preheating scrap in a preheater station, which container comprises in combination a metallic shell, a refractory support ring fixedly attached to and extending around the periphery of the inside of the shell in the lower portion thereof, a refractory lining laid-up against the inside of the shell and extending upwardly therein from the refractory support ring to near the top of the shell, a pair of partible jaws attached to a bracket on the outside of the shell and forming a closure on the bottom of the container, the improvement comprising a steel baffle plate extending peripherally around the inside of said container and positioned at an inclination between the refractory support ring and the shell of the container and fixedly positioned in the container with a gap between one end of the baffle plate and adjoining structures of the container.

3. The container for preheating scrap according to claim 2 wherein the steel baffle plate is attached to and downwardly divergent from the refractory support ring toward the inside surface of the shell of the container and terminating a distance therefrom.

4. The container for preheating scrap according to claim 2 wherein the steel baffle plate is attached to and upwardly divergent from the shell of the container toward the inner edge of the refractory support ring and terminating a distance therefrom.

5. A container for preheating scrap in a preheater station, which container comprises in combination a metallic shell, a refractory support ring fixedly attached to and extending around the periphery of the inside of the shell in the lower portion thereof, a refractory lining laid-up against the inside of the shell and extending upwardly therein from the refractory support ring to near the top of the shell, a pair of partible jaws attached to a bracket on the outside of the shell and forming a closure on the bottom of the container, the improvement comprising a first steel baffle plate attached to and downwardly divergent from the refractory support ring toward the inside surface of the shell of the container and terminating a distance therefrom and a second steel baffle plate attached to the inside of the shell of the container in the lower portion thereof and extending upwardly therefrom at an angle to the shell toward the refractory support ring and terminating a distance therefrom.

6. The container of claim 5 wherein the first and second steel baffle plates overlap.

7. The container of claim 6 wherein the overlapping portions of the first and second baffle plates are slidably engaged with each other.

8. A container for preheating scrap in a preheater station, which container includes a shell, a refractory lining laid-up against the inside of said shell, said refractory lining being supported upon a refractory support steel ring in the lower portion of the container, said refractory lining extending upwardly toward but in spaced relation with the top of the container and a pair of partible jaws to close the lower end of the container, the improvement comprising:

a. a first expansion means between the top of the container and the top of the refractory lining therein, and b. a second expansion means between the bottom of the refractory support steel ring and the bottom of the container.

9. The container of claim 8 in which the first expansion means of subparagraph (a) comprises a plurality of anchor means securely fastened to and spaced 360° around the inside of the shell of the container in spaced relation with the top layer of the refractory lining and the top of the shell of the container, a rammed refractory laid-up against the shell of the container in the space between the top of the refractory lining and the top of the shell of the container in alignment with the refractory lining and encasing said anchor means whereby said rammed refractory is anchored in place.

10. The container of claim 8 in which the second expansion means of subparagraph (b) comprises a first baffle plate attached to and downwardly divergent from a refractory support steel ring toward the container shell, a second baffle plate attached to and extending upwardly at an angle from the inner surface of the container shell toward the steel refractory support ring and closely adjacent to the first baffle plate, said combination of baffle plates forming a hypotenuse of a right triangle, said right triangle having one leg formed by a portion of the refractory support steel ring and the other leg being formed by a portion of the shell of the container between the bottom thereof and the refractory support steel ring and forming therebetween a right triangular space.

11. The container of claim 10 wherein the first and second baffle plates are in slidable contact, and the right triangular space between the shell and the baffle plates is filled with a castable refractory.

12. Container of claim 9 in which the second expansion means of subparagraph (b) comprises a baffle plate attached to and downwardly diverging from a refractory support steel ring toward the shell of the container, a baffle plate attached to and extending upwardly at an angle from the inner surface of the shell of the container toward the steel refractory support ring and in slidable contact with the other baffle plate, said combination of baffle plates forming a hypotenuse of a right triangle, said right triangle having one boundary formed by a portion of the refractory support steel ring and the other boundary being formed by a portion of the shell of the container between the bottom thereof and the refractory support steel ring, the right triangular space thus formed being filled with a castable refractory.

* * * * *